(12) United States Patent
Naganawa et al.

(10) Patent No.: US 11,213,057 B2
(45) Date of Patent: Jan. 4, 2022

(54) WATER-SOLUBLE POLYSACCHARIDE DERIVED FROM ROOT VEGETABLE AND METHOD FOR PRODUCING SAME

(71) Applicant: FUJI OIL HOLDINGS INC., Osaka (JP)

(72) Inventors: Shogo Naganawa, Izumisano (JP); Yoshinori Hasegawa, Kaizuka (JP)

(73) Assignee: FUJI OIL HOLDINGS INC., Osaka (JP)

( * ) Notice: Subject to any disclaimer, the term of this patent is extended or adjusted under 35 U.S.C. 154(b) by 231 days.

(21) Appl. No.: 16/463,975

(22) PCT Filed: Nov. 24, 2017

(86) PCT No.: PCT/JP2017/042228
§ 371 (c)(1),
(2) Date: May 24, 2019

(87) PCT Pub. No.: WO2018/097247
PCT Pub. Date: May 31, 2018

(65) Prior Publication Data
US 2020/0375230 A1  Dec. 3, 2020

(30) Foreign Application Priority Data

Nov. 28, 2016  (JP) .............................. JP2016-230136

(51) Int. Cl.
| | | |
|---|---|---|
| *A23L 19/12* | (2016.01) | |
| *A23L 5/20* | (2016.01) | |
| *A23L 29/30* | (2016.01) | |
| *A23C 9/156* | (2006.01) | |
| *A23L 2/62* | (2006.01) | |
| *A23L 2/66* | (2006.01) | |
| *A23L 2/68* | (2006.01) | |

(52) U.S. Cl.
CPC ............ *A23L 19/12* (2016.08); *A23C 9/1565* (2013.01); *A23L 2/62* (2013.01); *A23L 2/66* (2013.01); *A23L 2/68* (2013.01); *A23L 5/23* (2016.08); *A23L 29/30* (2016.08); *A23V 2002/00* (2013.01)

(58) Field of Classification Search
CPC . A23L 19/12; A23L 5/23; A23L 29/30; A23L 2/68; A23C 9/1565
USPC ........................................................ 426/590
See application file for complete search history.

(56) References Cited

U.S. PATENT DOCUMENTS

| | | | |
|---|---|---|---|
| 4,629,575 A | 12/1986 | Weibel | |
| 4,831,127 A | 5/1989 | Weibel | |
| 4,923,981 A | 5/1990 | Weibel et al. | |
| 5,008,254 A | 4/1991 | Weibel | |
| 6,632,469 B1 | 10/2003 | Takahashi et al. | |
| 9,107,450 B2 | 8/2015 | Nakamura et al. | |
| 2014/0134310 A1 | 5/2014 | Nakamura et al. | |
| 2015/0017316 A1 | 1/2015 | Nakamura et al. | |

FOREIGN PATENT DOCUMENTS

| | | | |
|---|---|---|---|
| EP | 0 958 746 | 11/1999 | |
| JP | S59-124902 | 7/1984 | |
| JP | H03-197502 | 8/1991 | |
| JP | H05-52170 | 8/1993 | |
| JP | 2000-273101 | 10/2000 | |
| JP | 2004-41239 | 2/2004 | |
| WO | 97/49298 | 12/1997 | |
| WO | WO-03084339 A1 * | 10/2003 | ............... A23G 9/42 |
| WO | 2012/176852 | 12/2012 | |
| WO | 2013/108838 | 5/2015 | |

OTHER PUBLICATIONS

Extended European Search Report dated Jul. 22, 2020 in corresponding European Patent Application No. 17874270.6.
International Search Report dated Feb. 20, 2018 in International Application No. PCT/JP2017/042228, with English Translation.
International Preliminary Report on Patentability dated Feb. 20, 2018 in International Application No. PCT/JP2017/042228.
Notification of Reasons for Refusal dated Apr. 11, 2017 in corresponding Japanese Patent Application No. 2016-230136, with Machine English Translation.

* cited by examiner

*Primary Examiner* — Jyoti Chawla
(74) *Attorney, Agent, or Firm* — Wenderoth, Lind & Ponack, L.L.P.

(57) ABSTRACT

The purpose of the present invention is to provide a water-soluble polysaccharide which is less expensive and enables the production of an acidic protein food or drink, said acidic protein food or drink being stable in an acidic pH range at the isoelectric point of protein or higher, even by using a starting material such as a root vegetable. A water-soluble polysaccharide, which is extracted from a starting material derived from a root vegetable in a wet state with hot water under acidic conditions of pH 2.7-3.7, can well stabilize an acidic protein food or drink in a pH range at the isoelectric point of protein or higher.

12 Claims, 2 Drawing Sheets

[Fig. 1]
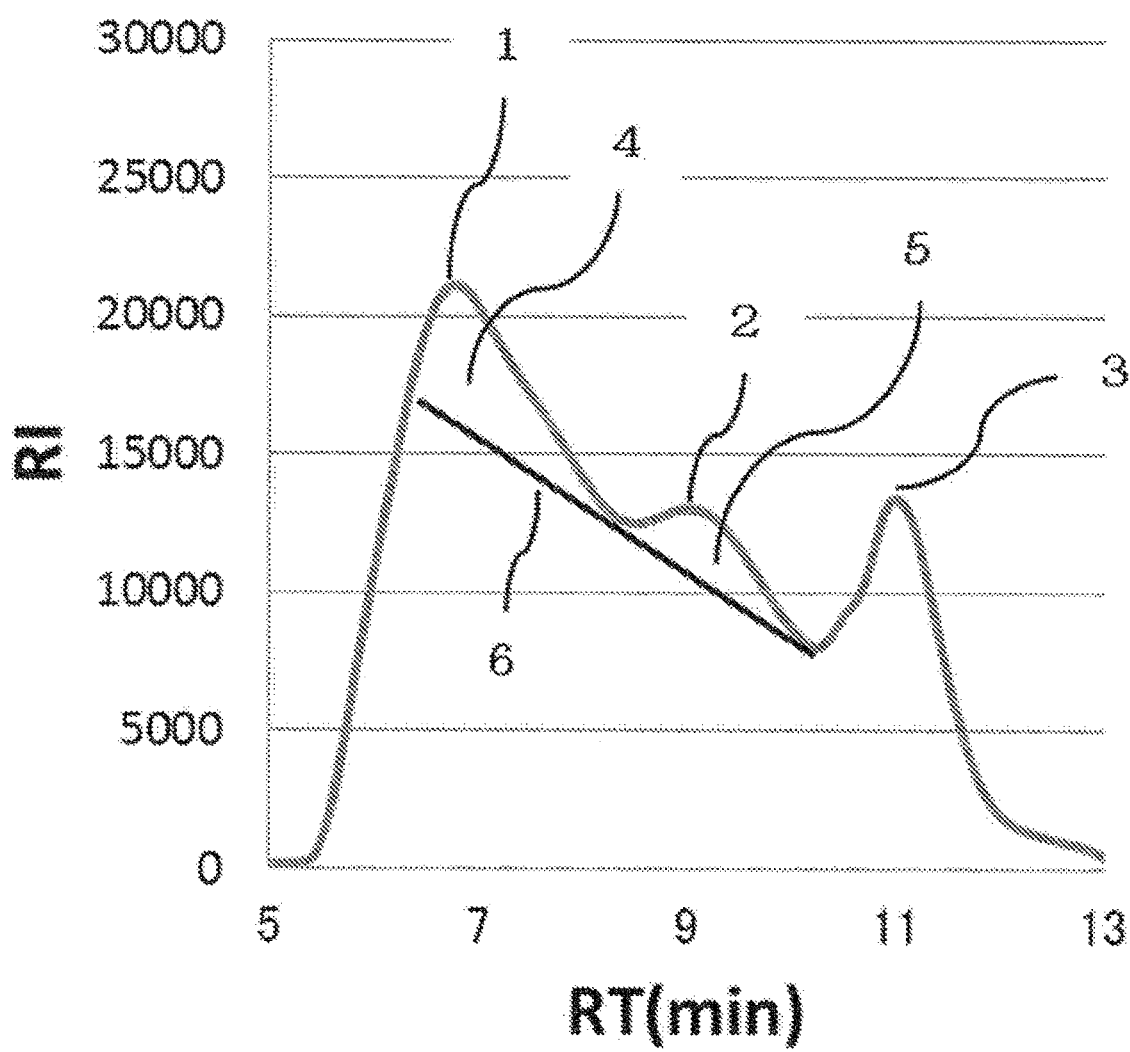

[Fig. 2]
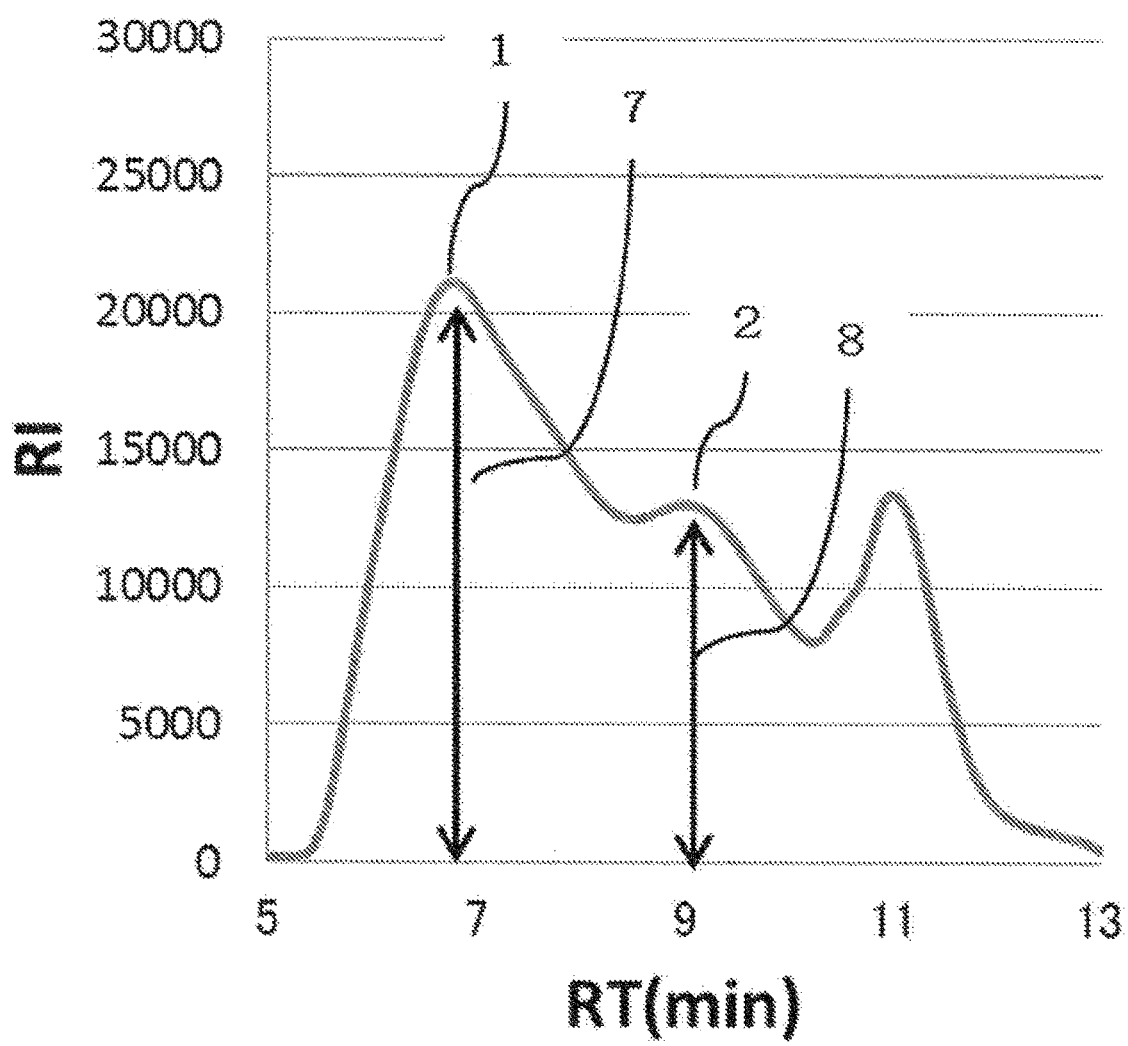

WATER-SOLUBLE POLYSACCHARIDE DERIVED FROM ROOT VEGETABLE AND METHOD FOR PRODUCING SAME

TECHNICAL FIELD

The present invention relates to a water-soluble polysaccharide derived from a root vegetable and a method for producing the same.

BACKGROUND ART

Acidic protein food-and-beverage is preferred as a food-and-beverage having refreshing acidity. However, protein is aggregated and precipitated under acidic conditions, and thereby the value as a product of the acidic protein food-and-beverage is significantly impaired. Therefore, a technology for stabilization with a high methoxyl pectin, a carboxymethyl cellulose, or a high molecular weight water-soluble soybean polysaccharide, for the purpose of preventing aggregation and precipitation of protein particles under the pH range below the isoelectric point of the protein in the production of acidic protein food-and-beverage, is disclosed (Patent Document 1). Recently, the demand for a protein dispersion stabilizer in an acidic pH range above the isoelectric point has been increasing. For example, a technology for stabilizing a protein component by adding an organic acid salt in a pH range between neutral and slightly acidic pH such as pH 5.2 is disclosed (Patent Document 2). In addition, a technology for stabilizing a protein component by adding pectin obtained by hot water extraction of root vegetables under the condition at pH 3.8 to 5.3 is disclosed (Patent Document 3).

PRIOR ART DOCUMENTS

Patent Documents

Patent Document 1: WO 2012/176852 A
Patent Document 2: JP H05-52170 B
Patent Document 3: JP 2004-41239 A

SUMMARY OF INVENTION

Problems to Be Solved By Invention

However, the technology of Patent Document 2 has had a problem that a clouding property of the stabilized protein is lost, and that a good acidic taste cannot be obtained due to an influence of the added organic acid salt. The technology of Patent Document 3 has not had a problem of taste as in Patent Document 2. However, the effect is confirmed in the case of only using a dried high cost raw material in Examples. The present inventors have confirmed that a water-soluble polysaccharide obtained from a raw material without drying under the extraction pH of Patent Document 3 does not provide a sufficient protein stability effect for an acidic beverage of about pH 5.0. Therefore, it is intended to provide a water-soluble polysaccharide, which enables to obtain an acidic protein food-and-beverage stable in an acidic pH of protein, and which may be prepared in low cost from a raw material, such as root vegetables which are used for providing good taste.

Means for Solving Problems

The present inventors have intensively studied in order to solve the above problems. As a result, they have found that a water-soluble polysaccharide which is extracted from a raw material derived from a root vegetable in wet state with a hot water under acidic condition at pH 2.7 to 3.7 may stabilize an acidic protein food-and-beverage in acidic pH range above the isoelectric point of the protein. The present invention has been completed based on the findings.

That is, the present invention is:

(1) a method for producing a water-soluble polysaccharide derived from a root vegetable, including extracting a raw material derived from the root vegetable, which is in wet state, with a hot water at pH 2.7 to 3.7;

(2) the method for producing a water-soluble polysaccharide derived from a root vegetable of (1), where the extraction pH is pH 2.8 to 3.6;

(3) the method for producing a water-soluble polysaccharide derived from a root vegetable of (1) or (2), where the raw material derived from the root vegetable is Irish potato;

(4) a water-soluble polysaccharide derived from a root vegetable, which satisfies the following (A) and (B) in a measurement using HPLC with a gel filtration chromatography:

a value of (second peak area/first peak area)×100 is 10% or more; and (A)

a value of (peak intensity at first peak/peak intensity at second peak)×100 is 70% or more, where (B)

the first peak area is an area enclosed by the first peak and a tangent line to the first peak, the second peak area is an area enclosed by the second peak and a tangent line to the second peak, and the first peak and the second peak are referred to in order from the peak having the earlier retention time in gel filtration, and where the peak intensity is the height of each peak;

(5) the water-soluble polysaccharide derived from a root vegetable of (4), where a value of (second peak area/first peak area)×100 is 12% or more, and (A)

a value of (peak intensity at first peak/peak intensity at second peak)×100 is 75% or more; (B)

(6) an acidic protein food-or-beverage, including the water-soluble polysaccharide of (4) or (5);

(7) the acidic protein food-or-beverage of (6), where pH of the acidic protein food-or-beverage is 4.2 to 6.5;

(8) the acidic protein food-or-beverage of (6), where pH of the acidic protein food-or-beverage is 4.5 to 6.5;

(9) the acidic protein food-or-beverage of (6), where pH of the acidic protein food-or-beverage is 4.2 to 6.0;

(10) the acidic protein food-or-beverage of (6), where pH of the acidic protein food-or-beverage is 4.5 to 6.0; and

(11) the acidic protein food-or-beverage of any one of (6) to (10), where the acidic protein food-or-beverage is an acidic protein beverage.

In other aspects, the present invention is:

(12) a method for producing a water-soluble polysaccharide derived from a root vegetable, including extracting a raw material derived from the root vegetable, which is in wet state, with a hot water at pH 2.7 to 3.7;

(13) the method for producing a water-soluble polysaccharide derived from a root vegetable of (12), where the extraction pH is pH 2.8 to 3.6;

(14) the method for producing a water-soluble polysaccharide derived from a root vegetable of (12) or (13), where the raw material derived from the root vegetable is Irish potato;

(15) a water-soluble polysaccharide derived from a root vegetable, which satisfies the following (A) and (B) in a measurement using HPLC with a gel filtration chromatography:

a value of (second peak area/first peak area)×100 is 10% or more; and (A)

a value of (peak intensity at first peak/peak intensity at second peak)×100 is 70% or more, where (B)

the first peak area is an area enclosed by the first peak and a tangent line to the first peak, the second peak area is an area enclosed by the second peak and a tangent line to the second peak, and the first peak and the second peak are referred to in order from the peak having the earlier retention time in gel filtration, and where the peak intensity is the height of each peak;

(16) an acidic food-or-beverage, including the water-soluble polysaccharide of (15);

(17) the acidic protein food-or-beverage of (16), where pH of the acidic protein food-or-beverage is 4.2 to 6.5; and

(18) the acidic protein food-or-beverage of (16) or (17), where the acidic protein food-or-beverage is an acidic protein beverage.

Effect of Invention

The present invention enables to obtain a water-soluble polysaccharide capable of stabilizing an acidic protein food-and-beverage in an acidic pH range above the isoelectric point at low cost by using a raw material derived from a root vegetable in a wet state without a drying step.

Furthermore, the produced acidic protein food may maintain a stable state even after heating such as retort sterilization.

BRIEF DESCRIPTION OF DRAWINGS

FIG. 1 is a gel filtration chart of a water-soluble polysaccharide derived from a root vegetable. The figure shows that the areas enclosed by a curve and a tangent are respectively first peak area and second peak area.

FIG. 2 is a figure showing the peak intensities in first peak and second peak.

DESCRIPTION OF REFERENCE NUMERALS

1: First peak, 2: Second peak, 3: Third peak, 4: First peak area, 5: Second peak area, 6: Tangent, 7: Peak intensity at first peak, 8: Peak intensity at second peak

MODE FOR CARRYING OUT INVENTION

Hereinafter, the present invention will be explained more specifically.

(Water-Soluble Polysaccharide)

A water-soluble polysaccharide of the present invention is obtained by extracting from a raw material derived from a root vegetable in a wet state with a hot water at pH 2.7 to 3.7.

In addition, the water-soluble polysaccharide derived from a root vegetable of the present invention has the following features (A) and (B) as measured by a method of analysis using HPLC with gel filtration chromatography.

a value of (second peak area/first peak area)×100 is 10% or more. (A)

a value of (peak intensity at first peak/peak intensity at second peak)×100 is 70% or more. (B)

In the above, the first peak area is an area enclosed by the first peak and a tangent line to the first peak, the second peak area is an area enclosed by the second peak and a tangent line to the second peak, and the first peak and the second peak are referred to in order from the peak having the earlier retention time in gel filtration, and the peak intensity is the height of each peak.

More specific explanations will be the followings.

(Calculation Method of Peak Intensity and Peak Area)

Among the elution peaks separated by gel filtration chromatography analysis, first peak, second peak, and third peak are selected from the peak with the earlier retention time. In the present invention, shoulder peak is also treated as a peak.

The derivative (slope) of the curve of the downward convex curve between the first peak and the second peak of the chromatographic curve and the downward convex curve between the second peak and the third peak are determined. At this time, both slopes are the same, and the two tangents make a tangent through the other contact point. The peak area enclosed by the tangent and the curve is referred to as "second peak area". The peak area enclosed when the tangent is extended to the first peak side is referred to as "first peak area" (FIG. 1).

Also, a peak intensity of the first peak is the height of the peak of the first peak, and similarly, a peak intensity of the second peak is the height of the peak of the peak of the second peak (FIG. 2).

Numerical values are calculated from the following formulas (A) and (B), respectively.

a value of (second peak area/first peak area)×100. (A)

a value of (peak intensity at first peak/peak intensity at second peak)×100. (B)

The water-soluble polysaccharide of the present invention has a numerical value (A) of 10% or more and a numerical value (B) of 70% or more. The value (A) is preferably 12% or more, and the value (B) is preferably 75% or more.

(Gel Filtration Chromatography)

The analytical conditions of HPLC with a gel filtration chromatography are as follows.

A filtrate obtained by preparing 1% by weight aqueous solution of water-soluble polysaccharide (50 mM aqueous sodium acetate, pH 5.0), and then filtering the solution through a 0.8 μm filter, is subjected to the analysis. To a TSK-gel G-5000 PWXL column (Tosoh Corporation; φ7.8 mm×300 mm) equilibrated in advance with 50 mM aqueous sodium acetate solution at pH 5.0 and 40° C., 20 μL of the filtrate is added, and separated at a flow rate of 1.0 mL/min. The separated polysaccharide is detected with a differential refraction detector (RI detector).

(Raw Material)

Examples of a raw material derived from a root vegetable in the wet state of the present invention include, potato such as Irish potato, sweet potato, taro, yam, and konjac; burdock; carrot; radish; lotus; and beet. In particular, Irish potato is preferable. As the Irish potato, a wet starch residue which is produced as a processing by-product of the starch industry is preferably used.

In the present invention, the "wet state" means a raw material containing water, which has not been subjected to a drying step. For example, in the case of starch residue which is a processing by-product of the starch industry, it is not subjected to a drying step although it is often dried from the viewpoint of shelf life. The moisture content of a raw material in wet state is approximately 40 to 99.9% by weight. Preferably, it is 50 to 99% by weight.

(Extraction pH)

It is essential that the extraction of pectic polysaccharides from a root vegetable in wet state is carried out under acidic condition of pH 2.7 to 3.7. The pectic polysaccharide extracted in the range out of this pH range, and the pectic polysaccharide which does not exhibit the characteristic second peak as measured by the method using HPLC with gel filtration chromatography do not exhibit a sufficient dispersion stabilization function of the protein in the pH range above the isoelectric point.

The extraction pH is preferably pH 2.8 to 3.6, more preferably pH 3.0 to 3.6.

(Extraction Temperature)

In addition, an extraction temperature of the water-soluble polysaccharide in the above pH range is preferably performed at a temperature higher than 100° C. When the extraction is performed at a temperature of 100° C. or less, elution of the water-soluble polysaccharide takes time and is economically disadvantageous. As the temperature gets higher, the extraction time may be shorter. However, if the temperature is too high, the taste and color tone may be adversely affected, as well as the water-soluble polysaccharide becomes lower molecular weight and the effect of exerting the function may decrease. Thus, it is preferable to carry out it at 130° C. or less.

(Purification)

The extracted water-soluble polysaccharide may be subjected to a purification of contaminants etc. Any method such as distribution with a hydrophilic polar solvent such as ethanol or isopropanol, desalting, and activated carbon treatment may be used for the purification.

The extracted water-soluble polysaccharide may be used in the state of aqueous solution, as well as in the dried powder by drying the aqueous solution. Examples of the drying method include spray drying, freeze drying, and drying by indirect heating.

(Dispersion Stabilizer)

The water-soluble polysaccharide of the present invention may be used as a dispersion stabilizer for acidic protein food-and-beverage.

Typically, an amount of the water-soluble polysaccharide used in the present invention is preferably 0.05 to 10% by weight, more preferably 0.2 to 5% by weight, based on the final product. However, the above amount is not intended to limit the scope of the present invention because the amount may vary depending on the difference in protein concentration, etc.

In addition, in the production of the acidic protein food-and-beverage of the present invention, conventional stabilizer, such as pectin derived from apple or citrus, water-soluble soybean polysaccharide, sodium carboxymethylcellulose, propylene glycol alginate, carrageenan, microcrystalline cellulose, chitosan, organic acid salt, polymerized phosphate, emulsifier, and heat-denatured protein, may be used in combination, and thereby stable pH range may be expanded.

(Acidic Protein Food-and-Beverage)

The acidic protein food-and-beverage of the present invention is an acidic protein food-and-beverage containing a protein derived from animal, plant, and/or microorganism, and includes an acidic protein beverage and an acidic protein food.

Examples of the acidic protein beverage include a beverage prepared by adding citrus fruit juice or other fruit juice, or organic acid such as citric acid and lactic acid, or inorganic acid such as phosphoric acid, to a beverage prepared by using animal or vegetable protein such as milk or soymilk, and fermented milk beverage such as lactic acid bacteria beverage (including viable bacteria type and sterilized type), drink yogurt, and kefir.

In addition, examples of the acidic protein food include acidic frozen dessert such as acidic ice cream prepared by adding fruit juice etc. to frozen dessert containing milk component such as ice cream and acidic milk beverage prepared by acidifying dairy product; acidic frozen dessert such as frozen yogurt; acidic dessert prepared by adding fruit juice etc. to gelled food such as pudding and bavarois; and yogurt.

Among them, acidic protein beverage is particularly preferred.

In the present invention, acidity refers to a pH range of pH 6.5 or less, preferably pH 6.0 or less. The lower limit of pH is preferably pH 4.2 or more, more preferably pH 4.5 or more. By setting the pH of the acidic protein food-and-beverage to the above range, the dispersion stabilizing effect of the water-soluble polysaccharide of the present invention is more effectively exhibited.

EXAMPLES

Hereinafter, embodiments of the present invention will be described by way of Examples. In the Examples, both part and % is weight basis.

Example 1

Preparation of Water-Soluble Polysaccharide (A)

Into 360 g of water, 200 g of Irish potato starch residue in wet state (water content 86%) was suspended, and pH of the suspension was adjusted to 3.5, and then the suspension was heated at 110° C. for 90 minutes to extract a water-soluble polysaccharide. After cooling, centrifugation (10000×g, 30 minutes) was performed to separate into a water-soluble polysaccharide extract and a precipitate. Equal weight water was added to the separated precipitate, and the mixture was centrifuged again, and the supernatant was mixed with the above pectin extract and then freeze-dried as it was to obtain each crude water-soluble polysaccharide. Ethanol was added to 60% by weight to precipitate water-soluble polysaccharide. The precipitate washed with 90% by weight of aqueous ethanol, and the obtained precipitate was air-dried to obtain water-soluble polysaccharide (A).

Examples 2 to 4

Preparation of Water-Soluble Polysaccharide (B, C, D)

Water-soluble polysaccharides (B) to (D) were obtained in the same manner as in Example 1 except that the pH during extraction was changed to 3.7, 3.0 and 2.8, respectively.

Comparative Examples 1 to 4

Preparation of Water-Soluble Polysaccharides (E, F, G, H)

Water-soluble polysaccharides (E) to (H) were obtained in the same manner as in Example 1 except that the pH during extraction was changed to 5.0, 4.5, 4.0 and 2.5, respectively.

Comparative Example 5

Preparation of Water-Soluble Polysaccharide (I)

Water-soluble polysaccharide (I) was obtained in the same manner as in Example 1 except that the raw material was changed from wet state to dry state.

Each of the recovered water-soluble polysaccharides was subjected to the evaluation of the protein dispersion stabilization function at pH 5.0 according to the formulation of Table 1. The evaluation results are shown in Table 2. The analytical results of gel filtration of each water-soluble polysaccharide are also shown in Table 2. It showed good dispersion stability of the protein at pH 5.0.

TABLE 1

| | |
|---|---|
| Water-soluble polysaccharide (2% solution) | 20 parts |
| Sugar liquid (50% solution) | 14 parts |
| Skim-milk liquid (12% solution) | 25 parts |
| Citric acid liquid | Adjusted to pH 5.0 |

○ Evaluation of Stability

The stability of the prepared dairy beverage was evaluated by the precipitation rate. The measurement method and the evaluation method are shown below.

[Precipitation Rate]

Acidic milk beverage is weighed at 20 g into a centrifuge tube, and centrifuged at 2,000 rpm for 20 minutes with a centrifuge (Model H-103N, manufactured by Kokusan Co., Ltd.). The supernatant is decanted off and the precipitation weight is determined. The precipitation rate is calculated by the following formula.

Precipitation rate (%)=(weight of precipitate)/(weight of acidic milk beverage)×100

The precipitation rate is described as ⊙ for precipitation rate of less than 1%, ○ for precipitation rate of 1% to less than 3%, Δ for precipitation rate of 3% to less than 7%, and × for precipitation rate of 7% or more.

TABLE 2

| | Water-soluble polysaccharide | Second peak area/ First peak area (%) | Peak strength of first peak/ peak strength of second peak (%) | Evaluation of acidic milk beverage (precipitation rate) |
|---|---|---|---|---|
| Example 1 | A | 39.4 | 155 | ⊙ |
| Example 2 | B | 11.5 | 170 | ○ |
| Example 3 | C | 60.2 | 126 | ⊙ |
| Example 4 | D | 121.1 | 73 | ○ |
| Comparative Example 1 | E | 6.8 | 222 | Δ |
| Comparative Example 2 | F | 8.1 | 182 | Δ |
| Comparative Example 3 | G | 9.4 | 184 | Δ |
| Comparative Example 4 | H | 213.2 | 65 | Δ |
| Comparative Example 5 | I | 421.5 | 62 | × |

The water soluble polysaccharides (A) to (D) showed excellent dispersion stability of protein at pH 5.0. On the other hand, the water soluble polysaccharides (E) to (H) extracted outside the extraction pH range of the present invention deviate from the present invention in the analysis value of gel filtration, and the dispersion stability of protein at pH 5.0 was bad. In addition, in the case of water-soluble polysaccharide (I) using a dry raw material as a raw material, the analysis value of gel filtration deviates from the present invention even if it is extracted under the conditions of the extraction pH of the present invention, and the dispersion stability of protein at pH 5.0 was bad.

Examples 5 to 6

The water-soluble polysaccharide (A) recovered in Example 1 was subjected to the evaluation of the protein dispersion stabilization function at pH 4.5 or 5.5, according to the formulation of Table 1 except that pH was adjusted to 4.5 or 5.5 by adding citric acid liquid. The evaluation results are shown in Table 3. It showed excellent dispersion stability of the protein at each pH.

TABLE 3

| | pH of acidic milk beverage | Evaluation of acidic milk beverage (precipitation rate) |
|---|---|---|
| Example 5 | 4.5 | ○ |
| Example 1 | 5.0 | ⊙ |
| Example 6 | 5.5 | ○ |

The invention claimed is:

1. A method for producing a water-soluble polysaccharide derived from a root vegetable, comprising extracting a raw material derived from the root vegetable, which is in wet state, with a hot water at pH 2.7 to 3.7 at a temperature higher than 100° C. and 130° C. or less, wherein the raw material in wet state is a raw material containing water, which has not been subjected to a drying step, and a moisture content of the raw material in wet state is 40 to 99% by weight.

2. The method for producing a water-soluble polysaccharide derived from a root vegetable according to claim 1, wherein the extraction pH is pH 2.8 to 3.6.

3. The method for producing a water-soluble polysaccharide derived from a root vegetable according to claim 1, wherein the raw material derived from the root vegetable is Irish potato.

4. The method for producing a water-soluble polysaccharide derived from a root vegetable according to claim 1, wherein the extraction pH is pH 3.0 to 3.6.

5. The method for producing a water-soluble polysaccharide derived from a root vegetable according to claim 2, wherein the raw material derived from the root vegetable is Irish potato.

6. The method for producing a water-soluble polysaccharide derived from a root vegetable according to claim 4, wherein the raw material derived from the root vegetable is Irish potato.

7. The method for producing a water-soluble polysaccharide derived from a root vegetable according to claim 1, wherein the moisture content of the raw material in wet state is 50 to 99.9% by weight.

8. The method for producing a water-soluble polysaccharide derived from a root vegetable according to claim 2, wherein the moisture content of the raw material in wet state is 50 to 99.9% by weight.

9. The method for producing a water-soluble polysaccharide derived from a root vegetable according to claim 3, wherein the moisture content of the raw material in wet state is 50 to 99.9% by weight.

10. The method for producing a water-soluble polysaccharide derived from a root vegetable according to claim 4, wherein the moisture content of the raw material in wet state is 50 to 99.9% by weight.

11. The method for producing a water-soluble polysaccharide derived from a root vegetable according to claim 5, wherein the moisture content of the raw material in wet state is 50 to 99.9% by weight.

12. The method for producing a water-soluble polysaccharide derived from a root vegetable according to claim 6, wherein the moisture content of the raw material in wet state is 50 to 99.9% by weight.

* * * * *